Figure 1:
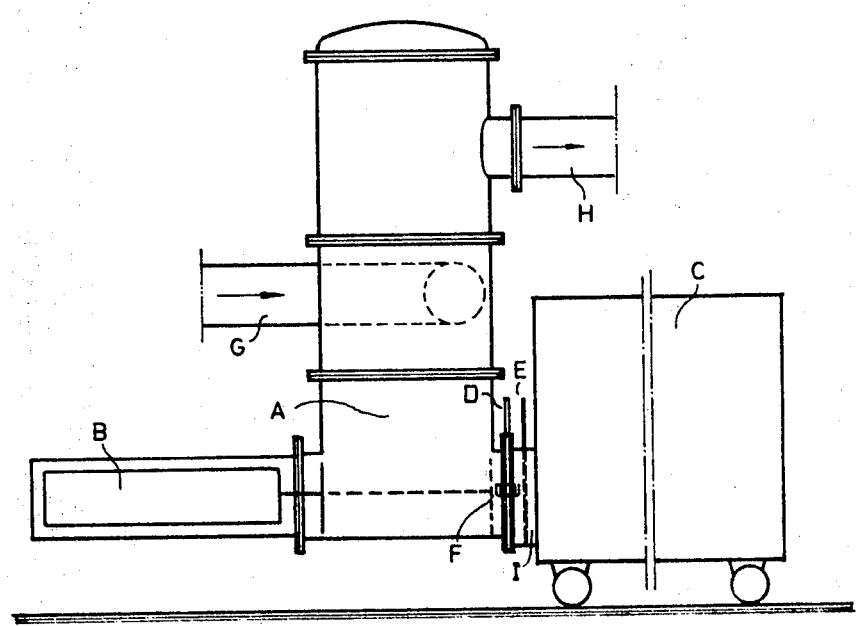

United States Patent

[11] 3,583,770

| [72] | Inventor | Karl Ingvar Malte Medhammar<br>Lidingo, Sweden |
|---|---|---|
| [21] | Appl. No. | 796,495 |
| [22] | Filed | Feb. 4, 1969 |
| [45] | Patented | June 8, 1971 |
| [73] | Assignee | AB Centralsug<br>Johanneshov, Sweden |
| [32] | Priority | Feb. 5, 1968 |
| [33] | | Sweden |
| [31] | | 1497/68 |

[54] METHOD AND MEANS FOR SUCTION OF VACUUM TRANSPORT OF REFUSE AND THE LIKE
3 Claims, 2 Drawing Figs.

[52] U.S. Cl. ............................................. 302/59, 100/229
[51] Int. Cl. ..................................................... B65g 53/14, B65g 53/46
[50] Field of Search ........................................ 100/229 A; 302/58—60, 62

[56] References Cited
UNITED STATES PATENTS

| 380,185 | 3/1888 | Chase | 100/229(A) |
|---|---|---|---|
| 1,971,421 | 8/1934 | Mackenzie | 302/59 |
| 2,013,477 | 9/1935 | Phelps et al. | 302/59X |
| 2,035,410 | 3/1936 | Smith | 302/59 |
| 2,087,464 | 7/1937 | Ayers | 302/59 |
| 2,199,894 | 5/1940 | Phelps | 302/59 |
| 2,230,425 | 2/1941 | Finnegan | 302/59X |
| 2,932,300 | 4/1960 | Dearsley | 302/59X |
| 3,059,789 | 10/1962 | Bowles | 100/229(A) |
| 3,229,622 | 1/1966 | French et al. | 100/229(A) |
| 3,318,231 | 5/1967 | Felts | 100/229(A) |

FOREIGN PATENTS

| 427,579 | 11/1924 | Germany | 100/229(A) |

OTHER REFERENCES
Refuse Removal Journal, September 1964, p. 69

*Primary Examiner*—Harvey C. Hornsby
*Assistant Examiner*—W. Scott Carson
*Attorney*—Albert M. Parker ABSTRACT: The invention is concerned with transport of refuse and the like by means of a suction or vacuum pipe system through which the refuse or the like is conveyed from a place of supply to a collecting container or silo where the refuse is separated from the entrained conveying suction air and removed from this collecting container. According to the invention the refuse or the like is removed from the collecting container at the same time, or substantially the same time, as new refuse is drawn into the container or silo while the subatmospheric pressure is still acting, said system being under the action of said subatmospheric pressure or vacuum while being substantially closed from the outer atmosphere in order to operate essentially continuously.

According to one embodiment of the invention the separated refuse or the like is compacted or compressed preferably in connection with its being removed from said collecting container.

PATENTED JUN 8 1971

3,583,770

KARL INGVAR MALTE MEDHAMMAR
INVENTOR.

BY Albert M. Parker
ATTORNEY.

METHOD AND MEANS FOR SUCTION OF VACUUM TRANSPORT OF REFUSE AND THE LIKE

Means are known for suction or vacuum transport of refuse or the like in which the refuse is transported by means of air under subatmospheric pressure through a pipe from a supply point, for example a refuse chute, to a collecting container or silo in which the transported refuse or the like is separated from the transport air. The collected refuse or the like is then removed from this collecting container to be taken to a final dumping place, for instance an incinerator, when the refuse is burned.

According to the invention it has been found extremely advantageous for this propose to remove the refuse from this collecting container or silo at the same time, or substantially the same time, as new quantities of refuse are drawn into the container or silo by means of air suctions or vacuum.

The invention relates to a method for suction transport of refuse and the like in a system in which the refuse is transported by means of suction air of subatmospheric or vacuum pressure through a pipe from a place of supply, for example a refuse chute, to a collecting container or silo in which the transported refuse or the like is separated from the transport suction air.

In this way the time available for suction transport is increased and the equipment thus has greater capacity. The collecting container or silo can also be made smaller and lower than otherwise so as to decrease the cost of the equipment. Automatisation of the emptying of the collecting container is also facilitated and the further transport of the refuse becomes less dependent upon the times for the suction transport.

The method according to the invention is characterized in that the refuse or the like is removed from the collecting container at the same time, or substantially the same time, as new refuse is drawn into the container or silo while the subatmospheric pressure is still acting, said system being under the action of said subatmospheric pressure or vacuum while being substantially closed from the outer atmosphere in order to operate essentially continuously.

The collecting container need not be emptied at the same rate as that at which the refuse enters the container.

A means for carrying out the method according to the invention must be designed so that the refuse is removed from the collecting container without noticeable quantities of the outside air having the opportunity to leak into the container, in which case the partial vacuum necessary for transporting the refuse might be completely or partly lost. The means can be designed in many different ways within the scope of this invention. This means only comprise a collecting container or silo connected to an inlet or a suction transport pipe for refuse or the like and an outlet pipe for discharging the refuse from said container or silo, means for removing the refuse or the like from a part of the collecting container or silo which is separated from the inlet of the suction transport pipe, and means for substantially preventing outer atmospheric air from leaking into the collecting container or silo when the refuse or the like is discharged from this container or silo.

According to a particularly suitable embodiment the refuse is compressed as it is taken out of the collecting container so that it is easier to handle and take up less space during its continued treatment.

Figure 2:
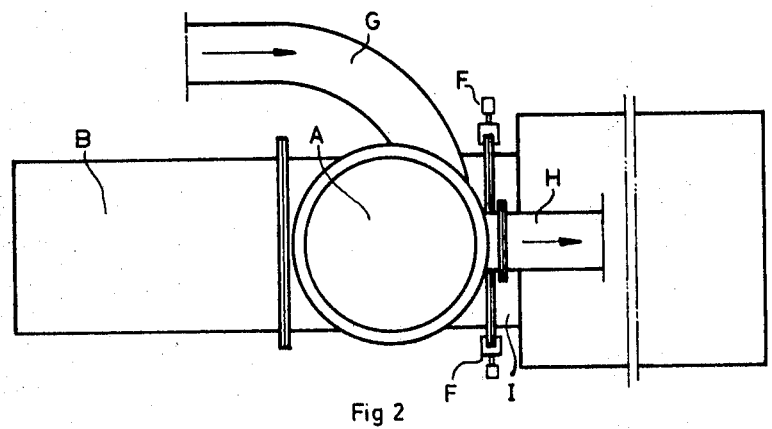

One embodiment of a means for carrying out the invention is shown diagrammatically in the accompanying drawings in which FIG. 1 is a side view and
FIG. 2 a top view.

The drawings shown that the silo or collecting c0ntainer A is connected to a supply pipe G for refuse which is drawn by means of suction or vacuum from a suitable supply point. The partial vacuum required for the transport is obtained, for example, through a tube H opening into the silo, said tube communicating with a suitable vacuum source, for example a suction pump. Suitably the pipe G enters the silo A tangentially so as to facilitate the separation of the refuse from the transport air, the latter passing out through the tube H.

The separated refuse is removed from the silo A at approximately the same rate as new refuse enters the silo. This must take place without any noticeable leakage of the outside air into the silo. For this purpose the system can comprise an approximately horizontal housing containing a piston or other discharging apparatus which forces the refuse out from the lower part of the silo A through a conduit I to a container which is detachable connected to the silo A and can be sealed off from the latter, such as a truck C for further transport, for example so that the refuse can be burned or destroyed.

The conduit I comprises two closing elements D, E and a connecting means F which, for example, may be hydraulic. The silo can be shut off by means of the closing element D when the element B is not in operation. The closing element E, which suitably is situated on the container C, ensures that the refuse does not unintentionally leave the container C. When the closing element D is open the refuse pushed forward by the piston can be compressed and transferred into the container C in this state or loaded directly onto some suitable arrangement. When the element D is closed the container C can be exchanged without the suction transport being interrupted, so that the means will act as a kind of sluiceway.

An indicator may be arranged which comes into operation when the container C is full and must be exchanged. This may possibly be carried out automatically by means of an impulse from the indicator. The connecting means F detachably connects A and C. Compression suitably takes place in C.

I claim:

1. Apparatus for suction transportation of material such as refuse comprising: a pipe adapted to convey material in an airstream from a place of material supply; a collecting silo connected in communication with the pipe for separating the transported material from the airstream and collecting the material, a vacuum source connected to said silo to draw the refuse through said pipe, said silo having a refuse outlet selectively closeable by means of a first closure member; a removable container having an inlet detachably connectable to said outlet, a second closure member in said inlet adapted to cooperate with said first closure member for permitting transfer of material from the silo to the container under subatmospheric pressure when both said closure members are open and for preventing leakage of air into the silo when said closure members are closed during removal of the container from the silo; and mechanical transfer means for transferring material from the silo to the container.

2. The apparatus of claim 1 wherein said transfer means is a piston slideable in said silo, the piston also being adapted to compress the material.

3. Apparatus according to claim 2 wherein the piston is normally located in a housing in communication with the interior of the silo.